US012372913B2

(12) United States Patent
Ogawa et al.

(10) Patent No.: US 12,372,913 B2
(45) Date of Patent: Jul. 29, 2025

(54) IMAGE FORMING APPARATUS WITH COVER HAVING FOLDED ARM

(71) Applicant: KYOCERA Document Solutions Inc., Osaka (JP)

(72) Inventors: Akira Ogawa, Osaka (JP); Masayuki Kakuta, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/634,850

(22) Filed: Apr. 12, 2024

(65) Prior Publication Data
US 2024/0345533 A1 Oct. 17, 2024

(30) Foreign Application Priority Data

Apr. 17, 2023 (JP) ................................ 2023-067352

(51) Int. Cl.
G03G 15/00 (2006.01)
B41J 29/13 (2006.01)
G03G 21/16 (2006.01)
H04N 1/00 (2006.01)

(52) U.S. Cl.
CPC .......... G03G 21/1638 (2013.01); B41J 29/13 (2013.01); G03G 15/6529 (2013.01); G03G 21/1633 (2013.01); G03G 21/1647 (2013.01); H04N 1/00551 (2013.01); H04N 1/00557 (2013.01); H04N 1/00559 (2013.01)

(58) Field of Classification Search
CPC ........... G03G 15/6529; G03G 21/1609; G03G 21/1628; G03G 21/1633; G03G 21/1638; G03G 21/1647; H04N 1/00551; H04N 1/00557; H04N 1/00559; B41J 29/13; F16C 11/04; F16C 11/10
See application file for complete search history.

(56) References Cited

U.S. PATENT DOCUMENTS

| 11,048,199 B2* | 6/2021 | Miyagawa | G03G 21/1633 |
| 2014/0212195 A1* | 7/2014 | Aoyama | G03G 21/1647 399/405 |
| 2017/0285558 A1 | 10/2017 | Tashiro et al. | |
| 2018/0004151 A1* | 1/2018 | Tsuda | G03G 21/1633 |
| 2024/0152089 A1* | 5/2024 | Uchida | G03G 21/1633 |

FOREIGN PATENT DOCUMENTS

JP 2017181656 A 10/2017

* cited by examiner

Primary Examiner — Sophia S Chen
(74) Attorney, Agent, or Firm — Alleman Hall & Tuttle LLP

(57) ABSTRACT

An arm is disposed between a body-side rotary shaft provided in a housing and a cover-side rotary shaft provided in a cover. The arm includes a body-side arm member with one end supported by the body-side rotary shaft, a cover-side arm member with one end supported by the cover-side rotary shaft, a connecting pin configured to connect the other end of the body-side arm member and the other end of the cover-side arm member, a body-side urging member configured to urge the body-side arm member and the cover-side arm member in respective directions of being folded, and a cover-side urging member configured to urge the cover-side arm member toward the cover. When the cover is closed, the body-side arm member and the cover-side arm member overlap each other in an axial direction of the connecting pin.

7 Claims, 8 Drawing Sheets

L ⟷ R

IMAGE FORMING APPARATUS WITH COVER HAVING FOLDED ARM

INCORPORATION BY REFERENCE

This application is based upon and claims the benefit of priority from the corresponding Japanese Patent Application No. 2023-067352 filed on Apr. 17, 2023, the entire contents of which are incorporated herein by reference.

BACKGROUND

The present disclosure relates to an image forming apparatus including a rotatable cover.

The image forming apparatus includes a housing and a cover supported by the housing rotatably around its lower end, and a sheet conveying path is formed between the housing and the cover. By rotating the cover upward, the sheet conveying path is formed, and by rotating the cover downward, the sheet conveying path is opened so that a paper jam or the like is handled. An arm is disposed between the housing and the cover to maintain the cover at a predetermined opening angle with respect to the housing.

A conventional damper mechanism (corresponding to the arm) includes a first rail member provided on an opening/closing member (corresponding to the cover), a second rail member engaged with the first rail member at one end and rotatably connected to the apparatus body (corresponding to the housing) at the other end, and a coil spring that urges the first rail member in a direction of approaching the second rail member. When the opening/closing member is opened, the moment at the time of rotation of the opening/closing member is attenuated by extension of the coil spring, and when the opening/closing member is closed, the coil spring is restored to reduce the load of the operation of closing the opening/closing member.

However, in the conventional damper mechanism, the first rail member is provided on the opening/closing member along the longitudinal direction, which requires a space for the first rail member on the opening/closing member, resulting in an increase in size of the opening/closing member. Furthermore, there are more design constraints to ensure the positional relationship between the first rail member and the second rail member.

SUMMARY

An image forming apparatus according to the present disclosure includes: a cover supported by a housing rotatably around a lower end of the cover and configured to form a sheet conveying path when rotated upward and to open the sheet conveying path when rotated downward; and an arm disposed between a body-side rotary shaft provided in the housing and a cover-side rotary shaft provided in the cover and configured to regulate an opening angle of the cover with respect to the housing, wherein the arm includes a body-side arm member with one end rotatably supported by the body-side rotary shaft, a cover-side arm member with one end rotatably supported by the cover-side rotary shaft, a connecting pin configured to rotatably connect the other end of the body-side arm member and the other end of the cover-side arm member, a body-side urging member configured to urge the body-side arm member and the cover-side arm member to rotate around the connecting pin in respective directions of being folded with respect to each other, and a cover-side urging member configured to urge the cover-side arm member to rotate around the cover-side rotary shaft in a direction of approaching the cover, and when the cover is rotated upward, the body-side arm member and the cover-side arm member overlap each other in an axial direction of the connecting pin.

In the present disclosure, the body-side urging member may be a torsion coil spring including a coil portion fitted around the connecting pin, a first arm portion engaged with the body-side arm member, and a second arm portion engaged with the cover-side arm member, and the cover-side urging member may be a torsion coil spring including a coil portion fitted around the cover-side rotary shaft, a first arm portion engaged with the cover, and a second arm portion engaged with the cover-side arm member.

In the present disclosure, the housing may be made of metal, and the body-side rotary shaft may be made of metal.

In the present disclosure, the housing may include a through hole into which the body-side rotary shaft is inserted, and when the body-side arm member is urged by the body-side urging member to rotate in a direction of approaching the cover-side arm member, the body-side rotary shaft may be pressed against an edge of the through hole.

In the present disclosure, the through hole may include a large-diameter portion having a diameter larger than a diameter of the body-side rotary shaft, a small-diameter portion having a diameter equal to the diameter of the body-side rotary shaft, and a connection portion configured to connect the large-diameter portion and the small-diameter portion, and the body-side rotary shaft may be pressed against an edge of the small-diameter portion.

In the present disclosure, the housing may include a vertical strut, a horizontal strut, and a side panel, and the through hole may be formed in the side panel near an intersection of the vertical strut and the horizontal strut.

In the present disclosure, the cover may include a bracket configured to support the cover-side rotary shaft.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an image forming apparatus according to an embodiment of the present disclosure will be described with reference to the drawings.

Figure 1:
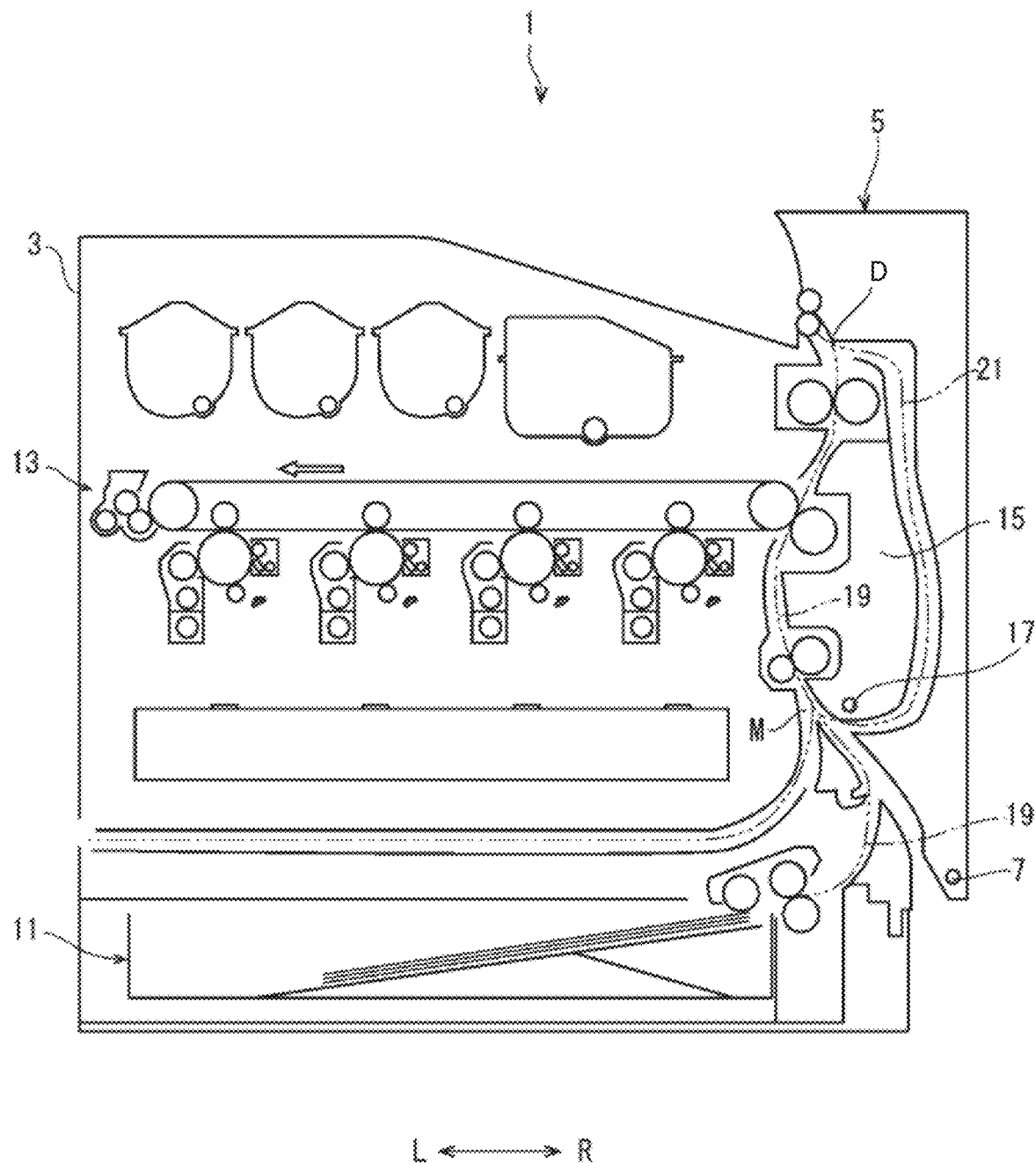
FIG. 1 is a front view schematically showing an internal structure of an image forming apparatus according to an embodiment of the present disclosure.
Figure 2:
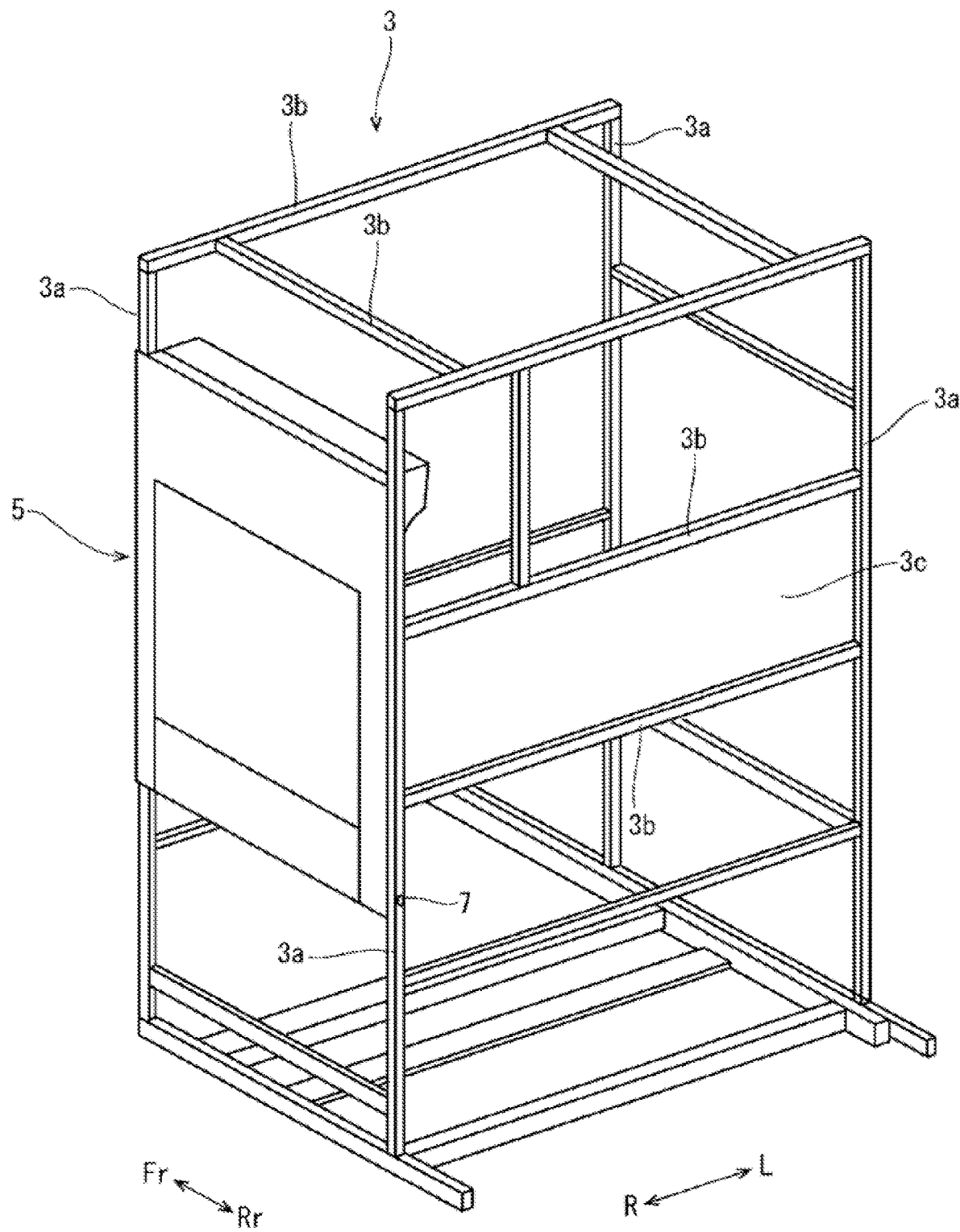
FIG. 2 is a perspective view showing a housing and a cover of the image forming apparatus according to an embodiment of the present disclosure.
Figure 3:
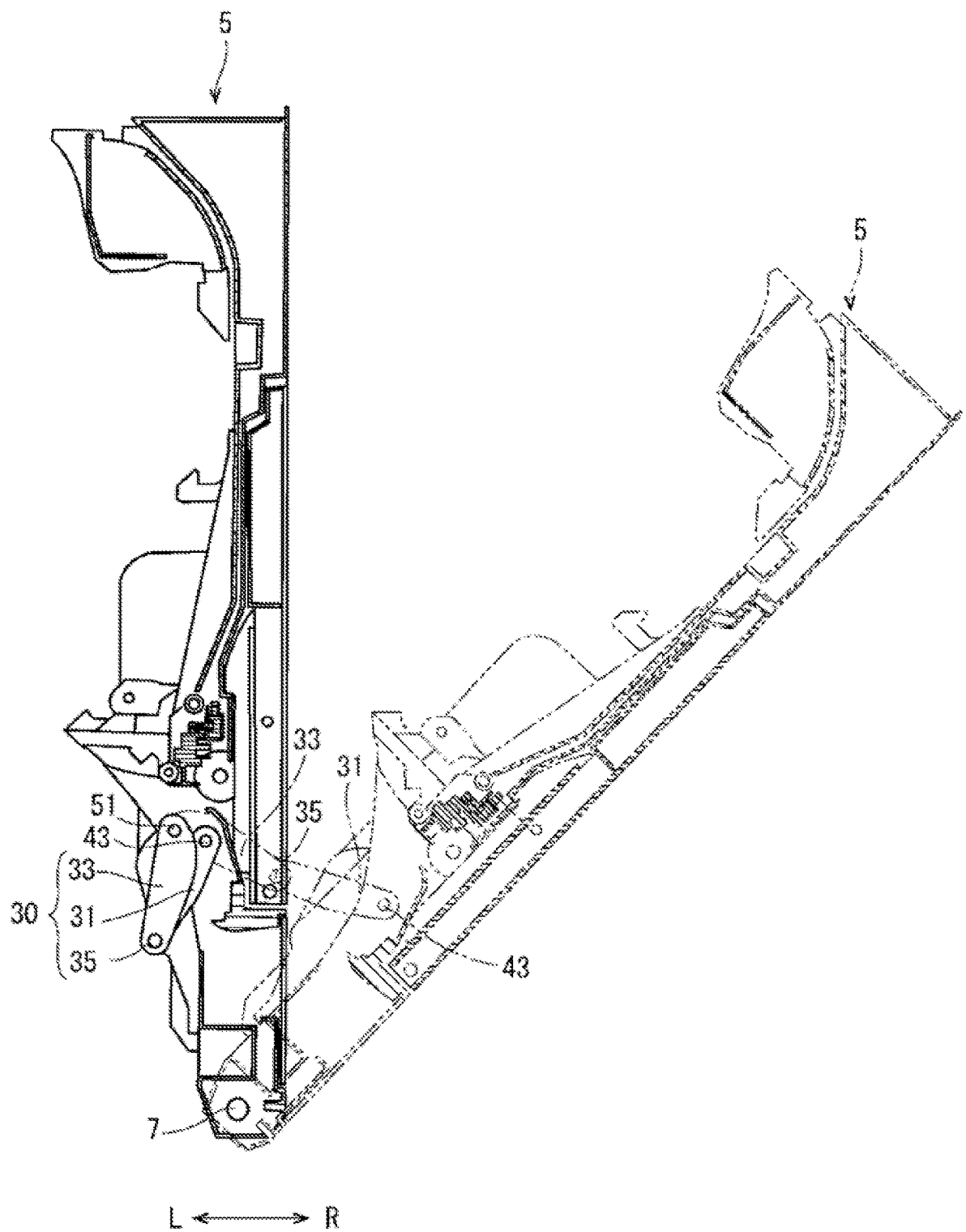
FIG. 3 is a front view showing the cover and an arm in the image forming apparatus according to an embodiment of the present disclosure.

An image forming apparatus 1 according to the present embodiment will be described with reference to FIG. 1, FIG. 2, and FIG. 3. FIG. 1 is a front view schematically showing an internal structure of the image forming apparatus 1, FIG. 2 is a perspective view showing a housing 3, and FIG. 3 is a front view showing a cover 5 and an arm 30. In the figures, Fr, Rr, L, and R indicate the front side, rear side, left side, and right side of the image forming apparatus 1, respectively.

The image forming apparatus 1 includes a box-shaped housing 3. As shown in FIG. 2, the housing 3 is composed of vertical struts 3a at the four corners, a plurality of horizontal struts 3b positioned between adjacent vertical struts 3a, side panels 3c that close predetermined spaces enclosed by vertical struts 3a and horizontal struts 3b, and the like.

As shown in FIG. 2, the side panels 3c include a rear side panel 3c that closes a space enclosed by two vertical struts 3a and two horizontal struts 3b on the rear side, and a front side panel 3c (not shown) that closes a space enclosed by two vertical struts 3a and two horizontal struts 3b on the front side.

The housing 3 is made of metal. The right side surface of the housing 3 is covered with a cover 5. The lower end of the cover 5 is rotatably supported by a rotary shaft 7 (see also FIG. 3) provided in vertical struts 3a adjacent to each other in the front-rear direction.

As shown in FIG. 1, a sheet feed portion 11 and an image forming portion 13 are housed in the housing 3. The sheet feed portion 11 is provided in a lower portion of the inside of the housing 3, and feeds a sheet from a sheet feed cassette in which sheets are stored by means of a sheet feed device.

The image forming portion 13 is provided above the sheet feed portion 11 and forms an image on a sheet fed from the sheet feed portion 11 using, for example, an electrophotographic method.

In addition, a conveying unit 15 is provided inside the cover 5. The lower end of the conveying unit 15 is rotatably supported by a rotary shaft 17 provided in vertical struts 3a (see FIG. 2) adjacent to each other in the front-rear direction.

A main conveying path 19 for sheets which extends along the up-down direction is formed between the image forming portion 13 and the conveying unit 15. The sheets are conveyed on the main conveying path 19 along a conveying direction that is upward.

A reverse conveying path 21 is formed between the conveying unit 15 and the cover 5. The reverse conveying path 21 branches from the main conveying path 19 at an upstream branch point D and merges with the main conveying path 19 at a downstream merging point M.

By rotating the cover 5 downward, the reverse conveying path 21 is opened so that a paper jam or the like is handled. By rotating the conveying unit 15 downward after rotating the cover 5 downward, the main conveying path 19 is opened so that a paper jam or the like is handled.

As shown by a dash-dot-dot-dash line in FIG. 3, when the cover 5 is rotated downward, the cover 5 is maintained at a predetermined opening angle with respect to the housing 3 by front and rear arms 30 disposed between the cover 5 and the housing 3. The opening angle is, for example, 45 degrees.

Figure 4:
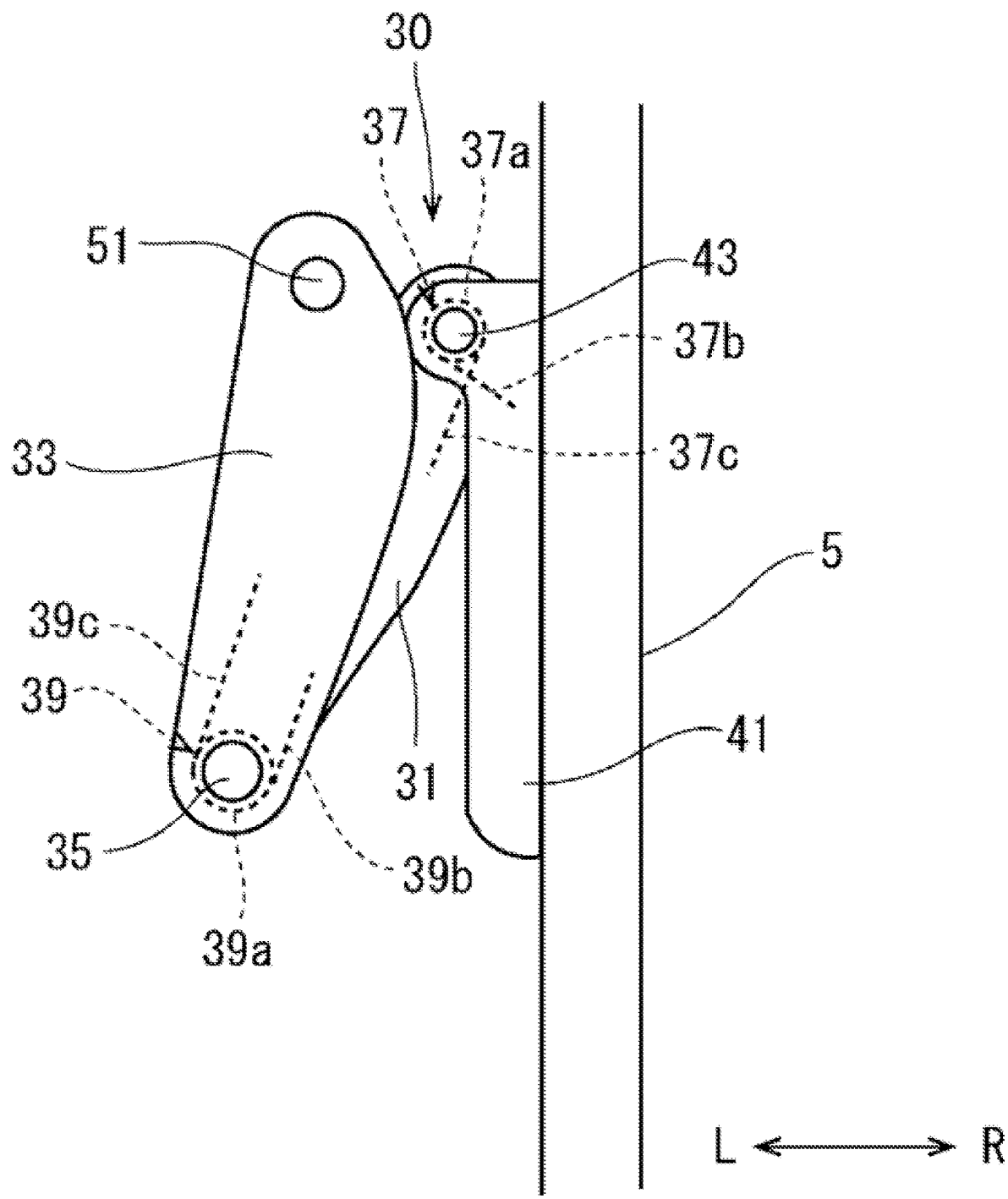
FIG. 4 is a front view schematically showing the arm in a state where the cover is rotated upward in the image forming apparatus according to an embodiment of the present disclosure.
Figure 5:
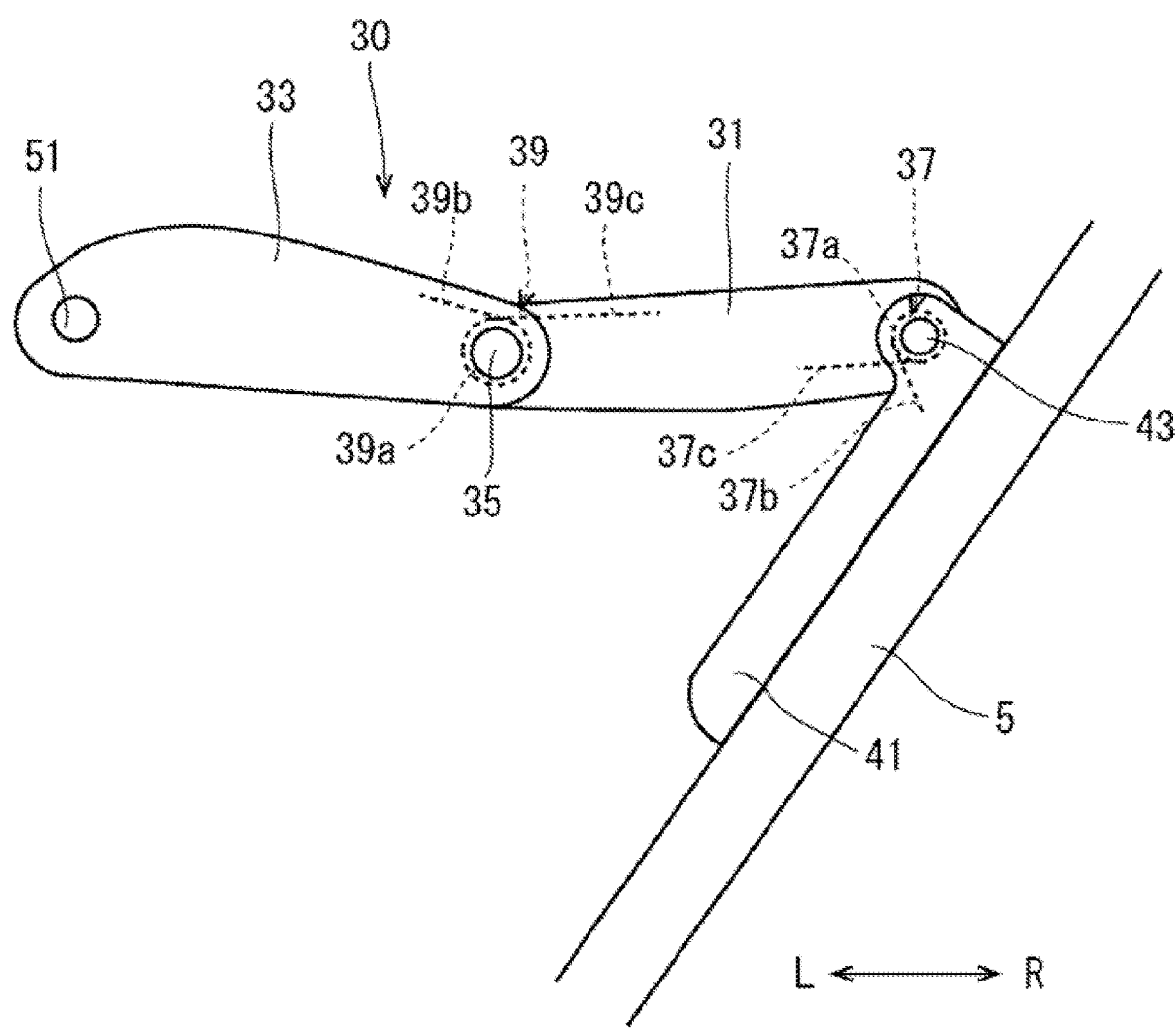
FIG. 5 is a front view schematically showing the arm in a state where the cover is rotated downward in the image forming apparatus according to an embodiment of the present disclosure.
Figure 6:
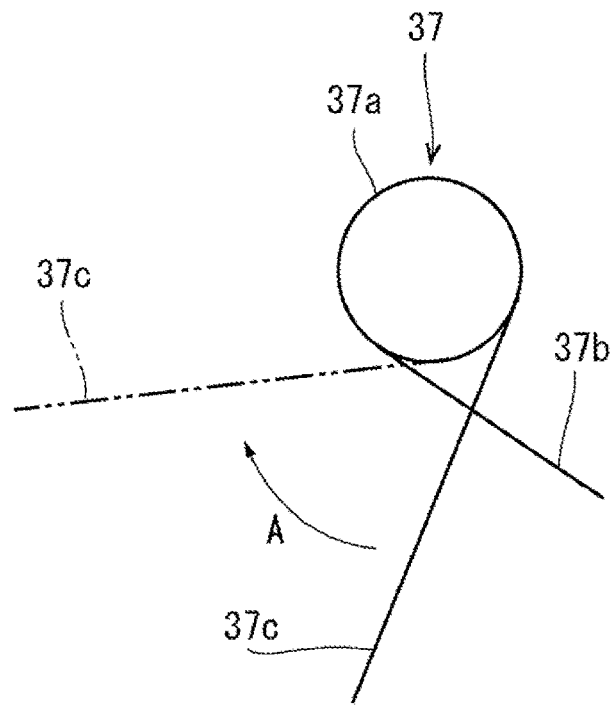
FIG. 6 is a diagram schematically showing the operation of a cover-side torsion coil spring in the state where the cover is rotated upward in the image forming apparatus according to an embodiment of the present disclosure.
Figure 7:
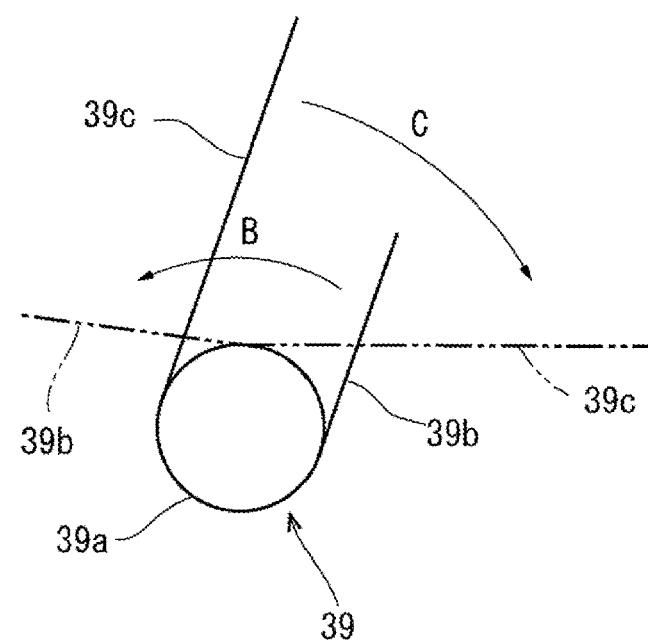
FIG. 7 is a diagram schematically showing the operation of a body-side torsion coil spring in the state where the cover is rotated upward in the image forming apparatus according to an embodiment of the present disclosure.
Figure 8:
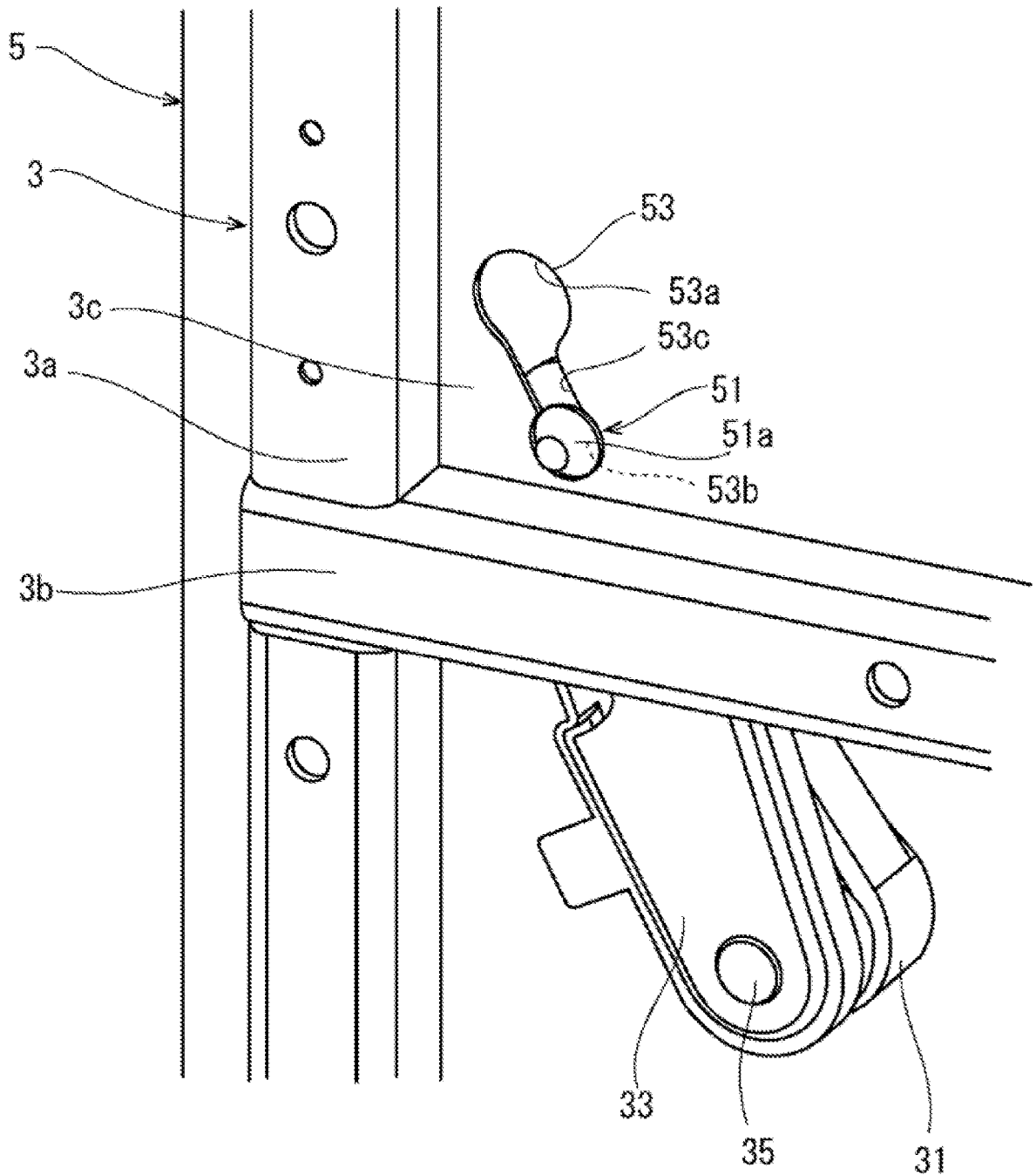
FIG. 8 is a perspective view showing a through hole in a side panel and a body-side rotary shaft in the image forming apparatus according to an embodiment of the present disclosure.
Figure 9:
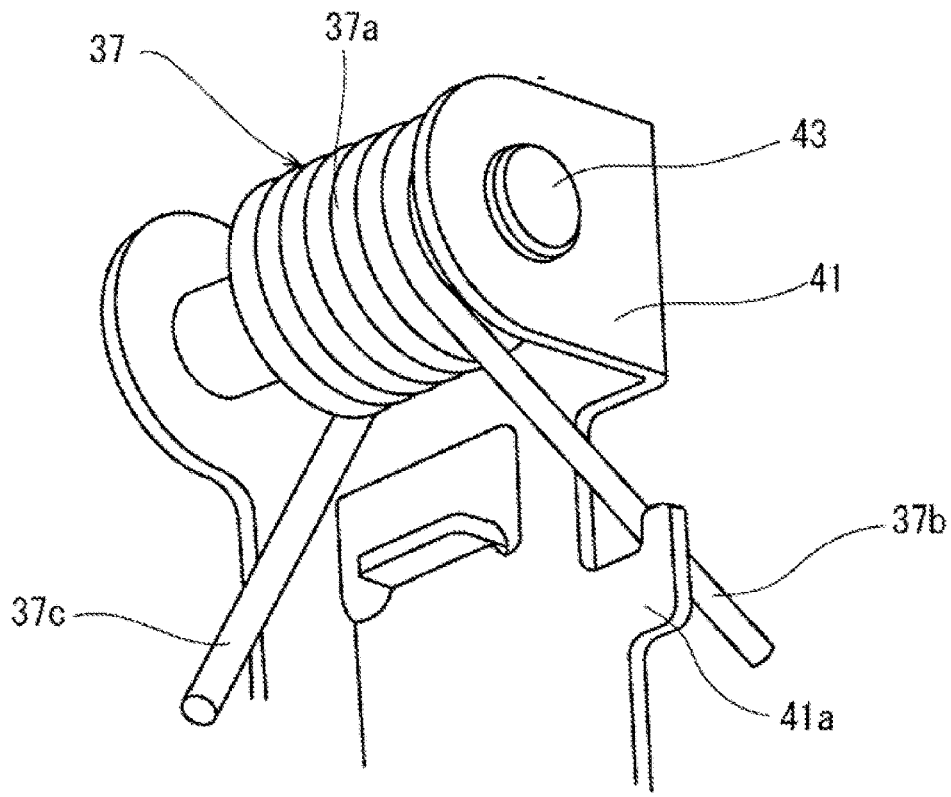
FIG. 9 is a perspective view showing a first arm portion of the cover-side torsion coil spring engaged with the cover (bracket) in the image forming apparatus according to an embodiment of the present disclosure.
Figure 10:
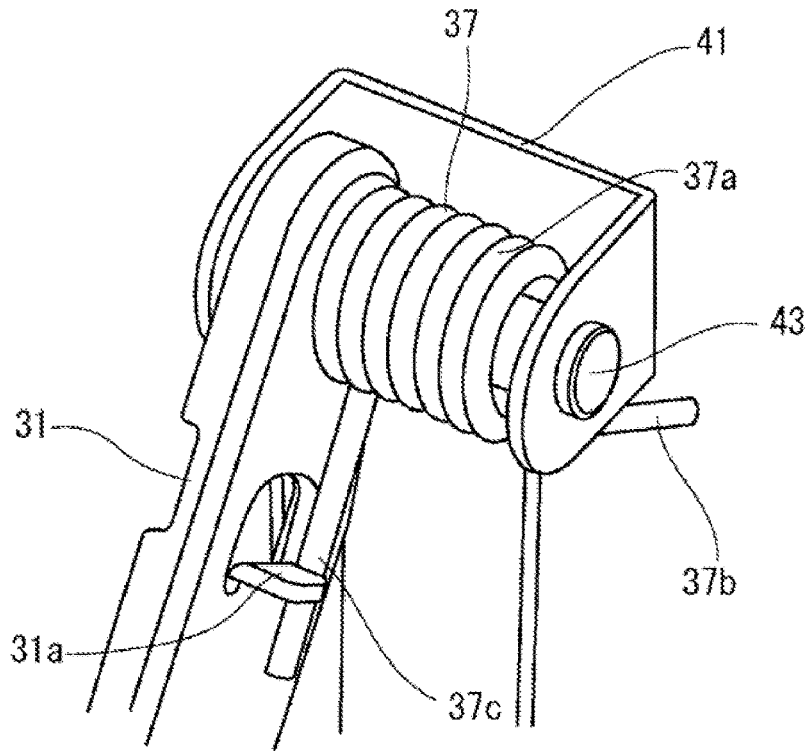
FIG. 10 is a perspective view showing a second arm portion of the cover-side torsion coil spring engaged with a cover-side arm member in the image forming apparatus according to an embodiment of the present disclosure.

Next, the arm 30 will be described with reference to FIG. 3 to FIG. 10. FIG. 4 and FIG. 5 are front views showing the arm 30, FIG. 6 and FIG. 7 are diagrams schematically showing a cover-side torsion coil spring 37 and a body-side torsion coil spring 39, FIG. 8 is a perspective view showing a body-side rotary shaft 51 and a through hole 53, and FIG. 9 and FIG. 10 are perspective views showing a first arm portion 37b and a second arm portion 37c of the cover-side torsion coil spring 37. In FIG. 4 and FIG. 5, the housing 3 is omitted.

As shown in FIG. 3 to FIG. 5, the arm 30 includes a cover-side arm member 31, a body-side arm member 33, a connecting pin 35, a cover-side torsion coil spring 37, and a body-side torsion coil spring 39. It is noted that the cover-side torsion coil spring 37 and the body-side torsion coil spring 39 are omitted in FIG. 3.

The cover-side arm member 31 is a substantially rectangular plate-like member with both longitudinal ends curved in an arc shape. As shown in FIG. 4 and FIG. 5, one end of the cover-side arm member 31 is rotatably supported by a cover-side rotary shaft 43 provided in a bracket 41 fixed to the inner surface of the cover 5.

The body-side arm member 33 is also a substantially rectangular plate-like member with both longitudinal ends curved in an arc shape. One end of the body-side arm member 33 is rotatably supported by a body-side rotary shaft 51 provided in the housing 3 shown in FIG. 2. The body-side rotary shaft 51 is made of metal and includes a shaft portion and a head portion 51a having a diameter larger than that of the shaft portion. It is noted that the large-diameter head portion 51a is shown in FIG. 8.

As shown in FIG. 8, the body-side rotary shaft 51 is rotatably supported by through holes 53 formed in the front and rear side panels 3c of the housing 3. The through holes 53 are each formed near the intersection of a vertical strut 3a and a horizontal strut 3b of the housing 3.

The through hole 53 is formed in a gourd shape. The through hole 53 has a large-diameter portion 53a having a diameter larger than the diameter of the head portion 51a, a small-diameter portion 53b having a diameter smaller than the outer diameter of the head portion 51a and equal to the outer diameter of the shaft portion, and a connection portion 53c that connects the large-diameter portion 53a and the small-diameter portion 53b.

By passing the head portion 51a through the large-diameter portion 53a and moving the shaft portion to the small-diameter portion 53b along the connection portion 53c, the body-side rotary shaft 51 is rotatably supported by the side panel 3c.

As shown in FIG. 3, FIG. 4, and FIG. 5, the connecting pin 35 rotatably supports the other end of the cover-side arm member 31 and the other end of the body-side arm member 33.

As shown in FIG. 4 and FIG. 6, the cover-side torsion coil spring 37 includes a coil portion 37a, a first arm portion 37b extending in a first direction from the coil portion 37a, and a second arm portion 37c extending in a second direction from the coil portion 37a.

In the natural state of the cover-side torsion coil spring 37, the angle between the first direction and the second direction is obtuse (approximately 240 degrees).

As shown in FIG. 9 and FIG. 10, the coil portion 37a is fitted around the cover-side rotary shaft 43. As shown in FIG. 9, the tip of the first arm portion 37b is engaged with a hook 41a provided on the bracket 41. As shown in FIG. 10, the tip of the second arm portion 37c is engaged with a hook 31a provided on the cover-side arm member 31.

The cover-side torsion coil spring 37 rotates the cover-side arm member 31 around the cover-side rotary shaft 43 in a direction of approaching the cover 5 (bracket 41) (see FIG. 4). As described above, the cover-side torsion coil spring 37 is an example of the cover-side urging member that urges the cover-side arm member 31 to rotate around the cover-side rotary shaft 43 in a direction of approaching the cover 5.

As shown in FIG. 4 and FIG. 7, the body-side torsion coil spring 39 includes a coil portion 39a, a first arm portion 39b extending in a first direction from the coil portion 39a, and a second arm portion 39c extending in a second direction from the coil portion 39a.

The first direction and the second direction are substantially parallel. The coil portion 39a is fitted around the connecting pin 35. The first arm portion 39b is engaged with a hook (not shown) provided on the body-side arm member 33.

The second arm portion 39c is inserted into a through hole (not shown) provided in the cover-side arm member 31. The body-side torsion coil spring 39 rotates the cover-side arm member 31 and the body-side arm member 33 around the connecting pin 35 in respective directions of closing each other. Thus, the cover-side arm member 31 and the body-side arm member 33 are folded so as to overlap each other in the axial direction of the connecting pin 35 (see FIG. 4).

The body-side torsion coil spring 39 is an example of the body-side urging member that urges the body-side arm member 33 and the cover-side arm member 31 to rotate around the connecting pin 35 in respective directions of being folded with respect to each other.

The rotation operation of the cover 5 in the image forming apparatus 1 having the above-described configuration will be described with reference to FIG. 4 and FIG. 5.

As shown in FIG. 4, in the state where the cover 5 is rotated upward, the cover-side arm member 31 is urged by the cover-side torsion coil spring 37 to rotate in the direction of approaching the bracket 41, and extends obliquely downward from the cover-side rotary shaft 43 toward the inside of the cover 5 (the inside of the housing 3).

In addition, the cover-side arm member 31 and the body-side arm member 33 are folded by the body-side torsion coil spring 39 so as to overlap each other in the axial direction of the connecting pin 35. The axial direction of the connecting pin 35 is the thickness direction of the arm members 31 and 33.

Accordingly, the body-side arm member 33 extends obliquely downward from the body-side rotary shaft 51 toward the inside of the cover 5, and the cover-side rotary shaft 43 is close to the body-side rotary shaft 51. In other words, the body-side arm member 33 extends obliquely downward from the body-side rotary shaft 51 toward the inside of the housing 3.

Further, the body-side arm member 33 is urged by the body-side torsion coil spring 39 so as overlap the cover-side arm member 31. Thus, the body-side rotary shaft 51 is pressed by the body-side arm member 33 against the edge of the small-diameter portion 53b of the through hole 53 (see FIG. 8) formed in the side panel 3c of the housing 3. As a result, the body-side rotary shaft 51 and the housing 3 are brought into close contact with each other to be electrically connected, and the body-side rotary shaft 51 is grounded through the housing 3.

When the cover 5 is rotated downward, the folded cover-side arm member 31 and the body-side arm member 33 are rotated to open as shown in FIG. 5.

That is, the cover-side arm member 31 rotates upward around the cover-side rotary shaft 43. At this time, as shown in FIG. 6, a load is applied to the second arm portion 37c of the cover-side torsion coil spring 37, and the second arm portion 37c is displaced to be closer to the first arm portion 37b (see arrow A). That is, a load is applied to the upward rotation of the cover-side arm member 31.

In addition, the body-side arm member 33 rotates upward around the body-side rotary shaft 51. As described above, when the cover-side arm member 31 rotates upward and the body-side arm member 33 rotates upward, the body-side torsion coil spring 39 is displaced so that the first arm portion 39b and the second arm portion 39c intersect each other as shown in FIG. 7.

That is, the first arm portion 39c is displaced toward the first arm portion 39b is displaced toward the second arm portion 39c (see arrow B), and the second arm portion 39c is displaced toward the first arm portion 39b (see arrow C). Thus, a load is applied to the rotations of the cover-side arm member 31 and the body-side arm member 33 in the respective opening directions.

By rotating the cover-side arm member 31 and the body-side arm member 33 in the directions of opening each other as described above, the opening angle of the cover 5 with respect to the housing 3 is regulated to a predetermined angle.

When the cover 5 is rotated upward, the cover-side torsion coil spring 37 and the body-side torsion coil spring 39 return to their free positions (see FIG. 4). That is, the cover-side torsion coil spring 37 urges the cover-side arm member 31 to rotate downward.

The body-side torsion coil spring 39 urges the cover-side arm member 31 and the body-side arm member 33 to rotate in the respective directions of overlapping each other. As a result, the load of the operation of rotating the cover 5 is reduced.

As is clear from the above description, according to the present disclosure, since the cover-side arm member 31 and the body-side arm member 33 are plate-like members, when the cover 5 is rotated upward, the cover-side arm member 31 and the body-side arm member 33 can be folded so as to overlap each other in the axial direction of the connecting pin 35 (the thickness direction of both arm members).

Accordingly, the arm 30 can be accommodated in a narrow space. In addition, the two torsion coil springs 37 and 39 can mitigate the impact when the cover 5 is suddenly rotated downward, and reduce the load of the operation when the cover 5 is rotated upward.

In addition, torsion coil springs 37 and 39, not compression springs, are used as an urging member that urges the body-side arm member 33 and the cover-side arm member 31 so as to be folded with respect to each other and as an urging member that urges the cover-side arm member 31 so as to rotate in the direction of approaching the cover 5. Thus, each of the urging members can be arranged in a narrow space.

In addition, the body-side arm member 33 is urged by the body-side torsion coil spring 39 to rotate in the direction of approaching the cover-side arm member 31, so that the body-side rotary shaft 51 is pressed against the edge of the through hole 53. As a result, the body-side rotary shaft 51 and the side panel 3c of the housing 3 can be reliably electrically connected.

In addition, the through hole 53 has a gourd shape, so that the body-side rotary shaft 51 can be easily supported by the side panel 3c only by inserting the body-side rotary shaft 51 into the large-diameter portion 53a of the through hole 53 and moving the body-side rotary shaft 51 to the small-diameter portion 53b through the connection portion 53c.

Further, the through hole 53 is formed in the side panel 3c near an intersection between a vertical strut 3a and a horizontal strut 3b. The side panel 3c is less likely to be deformed near the intersection. Accordingly, the shape of the through hole 53 is also less likely to be deformed, and the body-side rotary shaft 51 can be stably supported. Therefore, the body-side arm member 33 can be stably rotated.

Although a specific embodiment has been described in the present disclosure, the present disclosure is not limited to the above embodiment. Those skilled in the art can modify the above embodiment without departing from the scope and spirit of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a cover supported by a housing rotatably around a lower end of the cover and configured to form a sheet conveying path when rotated upward and to open the sheet conveying path when rotated downward; and
an arm disposed between a body-side rotary shaft provided in the housing and a cover-side rotary shaft provided in the cover and configured to regulate an opening angle of the cover with respect to the housing, wherein
the arm includes:
a body-side arm member with one end rotatably supported by the body-side rotary shaft;
a cover-side arm member with one end rotatably supported by the cover-side rotary shaft;
a connecting pin configured to rotatably connect another end of the body-side arm member and another end of the cover-side arm member;
a body-side urging member configured to urge the body-side arm member and the cover-side arm member to rotate around the connecting pin in respective directions of being folded with respect to each other; and
a cover-side urging member configured to urge the cover-side arm member to rotate around the cover-side rotary shaft in a direction approaching the cover, and
when the cover is rotated upward, the body-side arm member and the cover-side arm member overlap each other in an axial direction of the connecting pin.

2. The image forming apparatus according to claim 1, wherein
the body-side urging member is a torsion coil spring including a coil portion fitted around the connecting pin, a first arm portion engaged with the body-side arm member, and a second arm portion engaged with the cover-side arm member, and
the cover-side urging member is a torsion coil spring including a coil portion fitted around the cover-side rotary shaft, a first arm portion engaged with the cover, and a second arm portion engaged with the cover-side arm member.

3. The image forming apparatus according to claim 1, wherein the housing is made of metal, and the body-side rotary shaft is made of metal.

4. The image forming apparatus according to claim 3, wherein
the housing includes a through hole into which the body-side rotary shaft is inserted, and
when the body-side arm member is urged by the body-side urging member to rotate in a direction of approaching the cover-side arm member, the body-side rotary shaft is pressed against an edge of the through hole.

5. The image forming apparatus according to claim 4, wherein the through hole includes a large-diameter portion having a diameter larger than a diameter of the body-side rotary shaft, a small-diameter portion having a diameter equal to the diameter of the body-side rotary shaft, and a connection portion configured to connect the large-diameter portion and the small-diameter portion, and
the body-side rotary shaft is pressed against an edge of the small-diameter portion.

6. The image forming apparatus according to claim 4, wherein
the housing includes a vertical strut, a horizontal strut, and a side panel, and
the through hole is formed in the side panel near an intersection of the vertical strut and the horizontal strut.

7. The image forming apparatus according to claim 4, wherein the cover includes a bracket configured to support the cover-side rotary shaft.

* * * * *